United States Patent [19]

Barlage

[11] Patent Number: 5,012,401
[45] Date of Patent: Apr. 30, 1991

[54] SWITCHING POWER SUPPLY WITH FOLDBACK CURRENT LIMITING

[75] Inventor: Francis M. Barlage, Tucson, Ariz.

[73] Assignee: Allied-Signal Inc., Morris Township, Morris County, N.J.

[21] Appl. No.: 495,828

[22] Filed: Mar. 19, 1990

[51] Int. Cl.[5] .......................................... H02M 7/537
[52] U.S. Cl. ........................................ 363/97; 363/21; 363/56; 363/131
[58] Field of Search .................. 363/20, 21, 56, 79, 363/80, 95, 97, 131

[56] References Cited

U.S. PATENT DOCUMENTS

| | | |
|---|---|---|
| 3,737,736 | 6/1973 | Hasley et al. |
| 4,195,333 | 3/1980 | Hedel ................................. 363/21 |
| 4,263,642 | 4/1981 | Simmons et al. .................... 363/17 |
| 4,295,188 | 10/1981 | Brunssen ............................ 363/21 |
| 4,315,303 | 2/1982 | Snyder ............................... 363/21 |
| 4,316,242 | 2/1982 | Colangelo et al. .................. 363/21 |
| 4,449,174 | 5/1984 | Ziesse ................................ 363/21 |
| 4,449,175 | 5/1984 | Ishii et al. ......................... 363/26 |
| 4,481,564 | 11/1984 | Balaban ............................. 363/80 |
| 4,562,522 | 12/1985 | Adams et al. ...................... 363/56 |
| 4,628,433 | 12/1986 | Notohamiprodjo ................. 363/21 |
| 4,685,041 | 8/1987 | Bowman et al. ................... 363/40 |
| 4,791,546 | 12/1988 | Carroll .............................. 363/97 |

Primary Examiner—Steven L. Stephan
Assistant Examiner—Jeffrey Sterrett
Attorney, Agent, or Firm—Joseph R. Black; Robert C. Smith; Robert A. Walsh

[57] ABSTRACT

A switching power supply comprising a transformer (10) the secondary side of which communicates a feedback signal to a current limiter (35). The current limiter (35) consists essentially of resistor and diode elements (28, 32) and is operative in response to the feedback signal and a reference voltage signal received from a pulse-width modulator (26) to prevent or permit current flow through the diode (32).

23 Claims, 3 Drawing Sheets

SWITCHING POWER SUPPLY WITH FOLDBACK CURRENT LIMITING

This invention relates to switching power supplies for electronic circuits and more particularly to foldback current limiting in such power supplies.

BACKGROUND OF THE INVENTION

In electronic switching power supplies, a number of conditions could result in excess output current as, for example, where a short circuit is developed across the output. This excess current can damage components such as output diodes and transformers. In some systems, excess current is unlikely and no extra protection is employed. Frequently however, some means of protection is desirable and is accomplished by known techniques which include the following: (1) a foldback current limiter is used in the transformer secondary circuit and typically requires a series resistor, a transistor, a reference voltage means, and an amplifier; or (2) a maximum current limit is employed on the primary side with an undervoltage feedback detector to force the control loop into a "hiccup" mode. These techniques have significant disadvantages. The first requires a number of output components and places series elements in the output loop. If there are a plurality of secondaries, the described components are required for each output circuit which needs protection. Therefore, the first technique is costly and introduces more sources of failure and lost efficiency. The second technique allows the output circuit or circuits to be severely stressed during shorts or large overloads on the power supply output. During that time, the supply draws high current from the power source, thereby putting large current pulses on line and possibly causing interference with other equipment. Clearly, it would be desirable to provide for current limiting in a manner similar to the first technique, but without the foregoing disadvantages.

SUMMARY OF THE INVENTION

The invention relates to a switching-type power supply that is adapted to perform a foldback current limiting function with minimal use of circuit elements and minimal power loss during normal operation. The invention can be incorporated in power supplies having flyback topologies as well as those having forward converter topologies.

The invention comprises a transformer adapted on the secondary side thereof to produce an output signal for use by an external load and a feedback signal for use in providing an internal current limiting function; and current limiting means, responsive to the feedback signal and a reference voltage signal and comprising at least one diode and a resistor, for preventing current flow through the diode during normal operation of the power supply when the feedback signal exceeds a predetermined level, and for permitting current flow through the diode when the feedback signal is less than the predetermined level.

In different embodiments, the current limiting means may comprise a series combination of the resistor and the diode; a series combination of the resistor, a zener diode, and the diode; or a parallel combination comprising two branches, one of which comprises one of the foregoing series combinations, and the other of which comprises a second resistor.

DESCRIPTION OF THE PREFERRED EMBODIMENT

Figure 1:
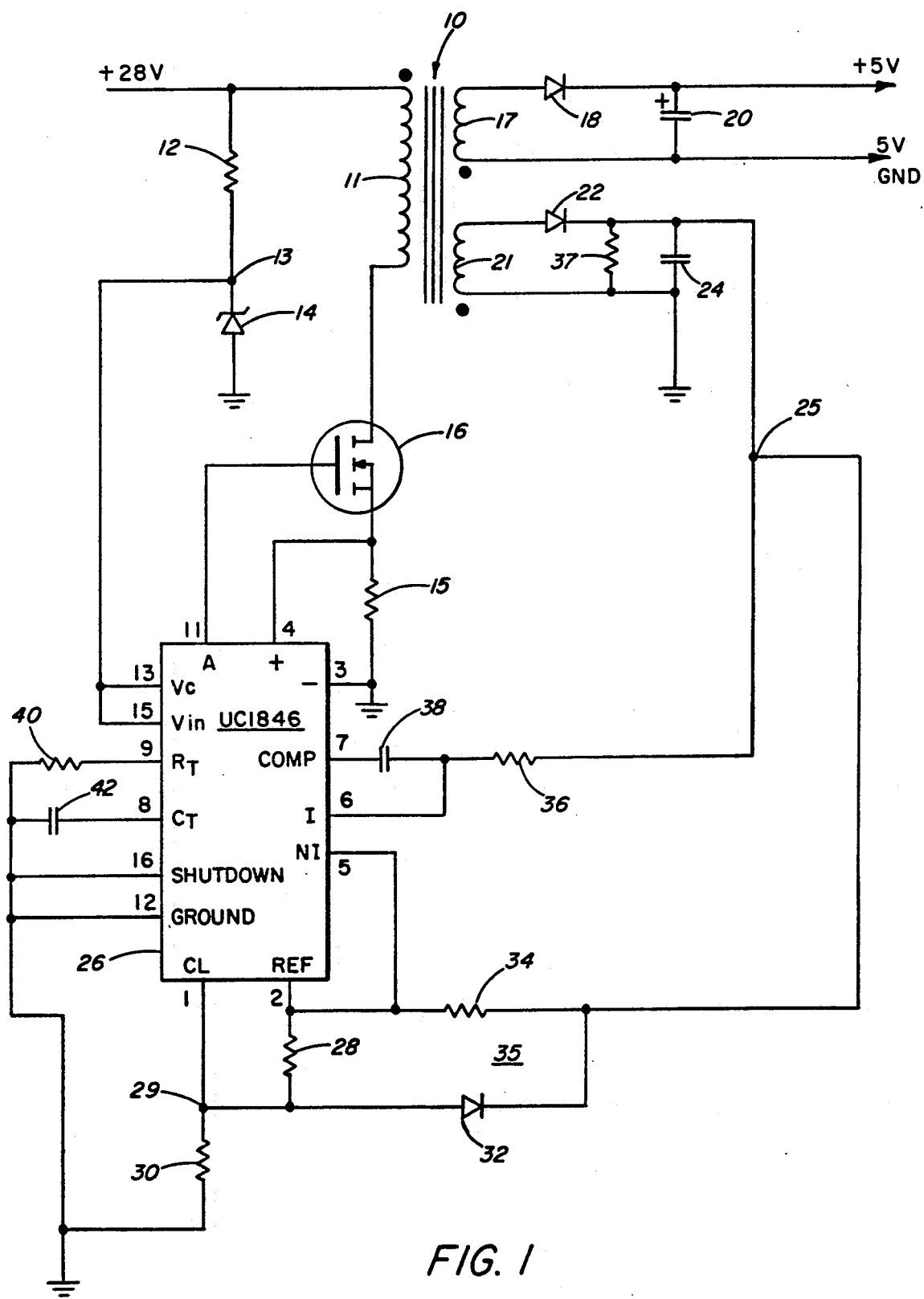
FIG. 1 is a schematic diagram of a switching-mode power supply incorporating the invention. In the illustrated power supply, the output is isolated from the primary side ground.

Referring now to FIG. 1, a 28-volt to 5-volt switching power supply is shown with an output transformer 10 connected in flyback topology. Connected across the 28 volt input are the primary side of the transformer 10, and a voltage limiting circuit including a resistor 12 and a zener diode 14.

The primary side of the transformer 10 comprises at least one primary winding 11 which is connected at one end to the 28-volt input and at an opposite end to a switching device. In the illustrated embodiments, the switching device is a power field-effect transistor 16 (FET). The primary winding 11, FET 16, and a resistor 15 are connected in series across the 28-volt input as shown, and the gate of the FET is connected to an output PIN 11 of an integrated circuit 26.

On the secondary side of the transformer 10 are first and second secondary windings 17, 21. A diode 18 is connected to one end of the first winding 17 and a capacitor 20 is connected across the winding and the diode. Diode 18 and capacitor 20 provide rectification and filtering for a 5-volt d.c. output available for use by an external load. The second winding 21 is connected at one end to a diode 22 for rectification. A capacitor 24 is connected across the winding 21 and diode 22 for filtering. A resistor 37 provides a nominal load connected across the winding 21 and diode 22. One side of the capacitor 24 is grounded and the opposite side is connected to a junction 25. The diode 22, resistor 37, and capacitor 24 collectively form a feedback circuit that is connected to a current limiter 35 via junction 25.

The current limiter 35 comprises a diode 32 which is reverse biased during normal operation of the power supply. In the preferred embodiment, the current limiter 35 is connected as shown and forms a parallel combination between the integrated circuit 26 and the forementioned feedback circuit. One branch of that combination comprises a resistor 34, and the other branch comprises a series combination of a resistor 28 and the diode 32.

Integrated circuit 26 (IC) is a pulse width modulator of a type (UC 1846) well known in the art. This circuit has sixteen connecting pins (PIN 1-PIN 16), some of which are not connected in this application and some of which are connected together. PINS 13 and 15 are connected to the voltage limiter circuit at a junction 13 to provide primary, 15-volt input power for the IC 26. An input at PIN 15 ranging from approximately 8 volts to the top limit of the IC 26 yields a reference voltage output at PIN 2 of approximately 5.1 volts. Resistor 28 of the current limiter 35 is connected to PIN 2. Resistor 30 is connected to PIN 1 of the IC 26, which is a current limit input. These resistors 28, 30 determine the maximum allowable peak current in the primary winding 11. The actual current through the primary winding 11 is sensed via inputs PIN 3, PIN 4 connected at opposite ends of resistor 15. Also connected to the PIN 2 output is the resistor 34. The junction 29 between resistors 28 and 30 is connected through the current limiter 35 to junction 25. PIN 5 is a noninverting input to an internal op-amp. As shown, PIN 5 receives the PIN 2 output as its input. PIN 6 is the inverting input to the op-amp and is connected to resistor 36 to sense the output voltage of the secondary side of the transformer 10. PIN 7 is the output of the op-amp and is connected externally to the IC 26 through a capacitor 38 to form an integrator. The resistor 36 and a capacitor 38 set the loop response for the power supply to ensure stable operation. PINS 8 and 9 are inputs to an internal oscillator. Resistor 40 and capacitor 42 determine the switching frequency of the power supply.

Operation proceeds as follows. When the power supply is energized by the 28-volt power source, the IC 26 regulates the reference voltage signal at PIN 2 in accordance with the input voltage received at PIN 15. The output at PIN 2 raises the voltage at junction 29 (hence, the voltage input at PIN 1) to a level determined by resistors 28 and 30. A constant-frequency control signal is communicated from the PIN 11 output of the IC 26 to the gate of the FET 16. The duty cycle of the control signal is variable and is adjusted by the IC 26 in response to input signals received at PINS 1, 4, 5, and 6. The IC 26 varies the duty cycle in a manner which tends to cancel the difference between the PIN 5 and PIN 6 inputs, the latter of which is a modified output from the secondary side of the transformer 10. While the capacitors 20, 24 on the secondary side are being charged during startup, the feedback voltage signal at junction 25 is lower than that which prevails during normal operation. During the startup mode, the reference voltage at PIN 2, minus the drop across resistor 28, exceeds the feedback voltage at junction 25 and current flow is permitted through diode 32. Thus, the voltage at junction 29 is also less than that obtained during normal operation, and this voltage ramps up during the startup mode until the voltage at junction 25 is sufficiently high to reverse-bias the diode 32. At that point, the voltage at junction 29 is maximal, as is the duty cycle of the control signal communicated to the FET 16, and a state of normal operation ensues. When a short develops across the output of the transformer 10, the feedback voltage at junction 25 is reduced to a very low level and the diode 32 becomes forward-biased. Resistor 34 in the current limiter 35 and resistor 28 have much higher resistances than resistor 37 in the feedback circuit. Thus, current flow through the diode 32 sinks through resistor 37 and the voltage at junction 29 is significantly decreased, as is the voltage at PIN 6. In response to change in signals received at PIN 1, the IC 26 decreases the duty cycle of the control signal at PIN 11. In response to the decreased duty cycle, the FET 16 reduces current flow through the primary winding 11. This in turn decreases the energy going across the transformer 10 to prevent excess current at the output. When the short is corrected, the voltage at junction 29 ramps up in a manner similar to that described for the startup mode.

Figure 3:
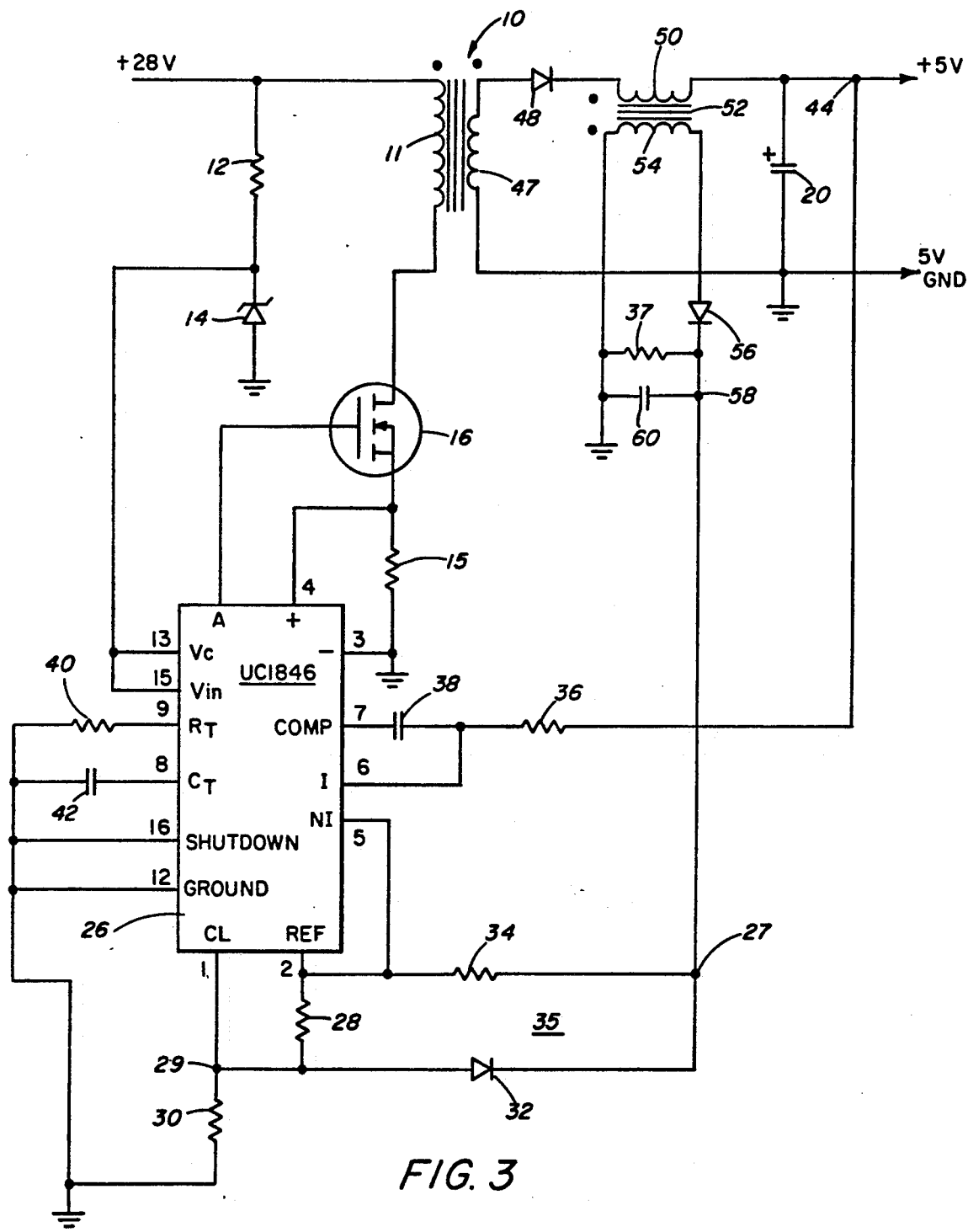
FIG. 3 is a schematic diagram of another power supply incorporating the invention wherein the secondary side of the transformer is connected in forward converter topology.
Figure 4:
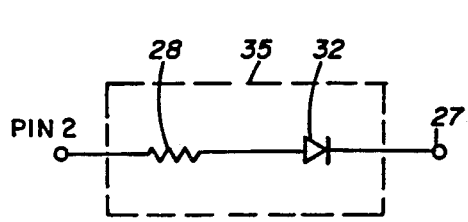
FIG. 4 schematically illustrates a simpler version of the current limiter employed in the power supplies of FIGS. 1-3.
Figure 5:
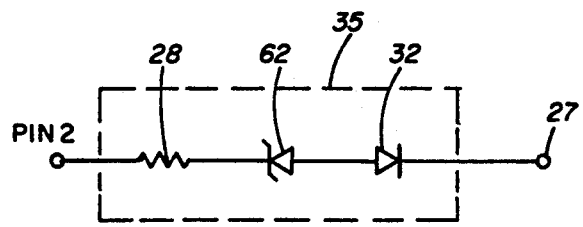
FIG. 5 schematically illustrates another version of the foresaid current limiter.

The current limiter 35 could be provided in the forms indicated by FIGS. 4 and 5. In FIG. 4, the current limiter 35 comprises a series combination of resistor 28 and the diode 32, whereas in FIG. 5 a suitable zener diode 62 is added. However, it should be noted that in some applications difficulty could be encountered in reverting to normal operation after a short is corrected. This is attributable to the fact that conditions on the secondary side of the transformer 10 are then not the same as under a cold startup condition. Specifically, and depending on such factors as the desired output load range and the transformer turns ratio, it could prove difficult in a particular design to obtain a sufficiently high initial increase in the voltage at junction 29. Once the short has been corrected, it is typically necessary to ensure that the energy associated with the next pulse going through the primary winding 11 is sufficiently high to at least minimally exceed the energy then demanded at the secondary side of the transformer 10. This will ensure a voltage increase on the secondary side. That increase should be sufficient to effect a increase in the voltage at junction 29 that in turn will yield an increase in the duty cycle of the control signal communicated to the FET 16. In designs which employ current limiters equivalent to those illustrated in FIGS. 4 and 5, but which have questionable restarting capability, the voltage at junction 29 during the restart mode can be increased by adding the resistor 34 to provide the current limiter 35 in the form illustrated in FIGS. 1–3. Typical values for resistors 28, 30, 34, 36, and 37 are 25K, 30K, 2K, 3K, and 100 ohms, respectively.

Figure 2:
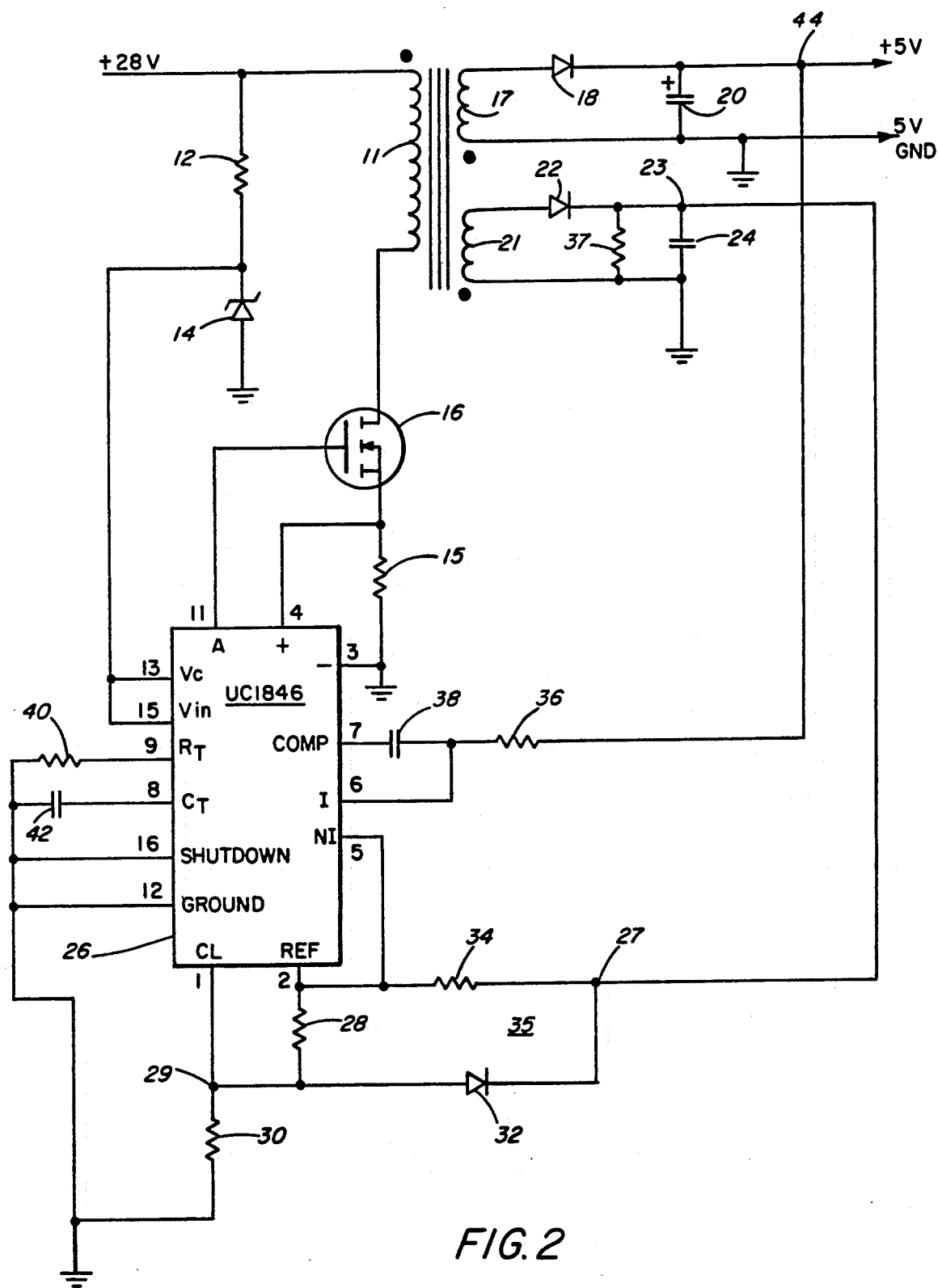
FIG. 2 is a schematic diagram of the power supply illustrated in FIG. 1, modified by the fact that the output is not isolated from the primary side ground.

FIG. 2 illustrates use of the invention in a power supply which does not isolate the output of the first winding 17 from the primary side. The circuit is almost identical to that illustrated in FIG. 1 except that the input to PIN 6 is derived from the signal-conditioned output of the first secondary winding 17, as indicated at junction 44.

FIG. 3 illustrates use of the invention in a power supply with forward converter topology. The secondary winding 47 of the transformer 10 is wound opposite to those 17, 21 of FIGS. 1 and 2. Connected in series to one end of the secondary winding 47 is a diode 48 and a winding 50 of a choke 52. A capacitor 20 is connected across the secondary winding 47, the diode 48, and the choke 52, and is grounded at its opposite end. The choke winding 54 is inductively related to choke winding 50 and senses voltage across winding 50 and diode 48 when the FET 16 is off. A diode 56 is connected to one end of the winding 54 and the opposite end of the winding is grounded. A capacitor 60 and resistor 37 are connected across the winding 54 and diode 56. The feedback signal sensed on winding 54, as rectified and filtered by diode 56 and capacitor 60, appears at junction 58 which is connected to the current limiter 35 at junction 27. The input to the integrator is the signal-conditioned output of the secondary winding 47, as modified by the drop across resistor 36.

The reader should understand that the foregoing portion of the description, which includes the accompanying drawings, is not intended to restrict the scope of the invention to the illustrated embodiments or to specific details which are ancillary to the teaching contained herein. Accordingly, the invention should be construed as broadly as is consistent with the following claims and their equivalents.

What is claimed is:

1. In a switching power supply, apparatus comprising in combination:
   a transformer having a primary side comprising at least one primary winding and a secondary side comprising at least one secondary winding, the secondary side being adapted to provide an output signal for use by an external load and a feedback signal for use in internal current limiting; and
   current limiting means, comprising a series combination of a resistor and a diode connected to the secondary side to receive the feedback signal such that the diode is reverse-biased in reference to the feedback signal and is interposed between the resistor and the secondary side, for preventing current flow through the diode when the feedback signal exceeds a predetermined level during normal operation of the power supply and for permitting current flow through the diode when the feedback signal is less than the predetermined level, the current limiting means being operative in response to the feedback signal and a reference voltage signal to prevent or permit current flow through the diode.

2. The invention of claim 1 wherein the current limiting means comprises a series combination of the diode, a zener diode, and the resistor, the diodes being interposed between the resistor and the secondary side.

3. The invention of claim 1 wherein the current limiting means comprises a parallel combination having at least two branches, a first of the branches comprising the series combination and a second of the branches comprising a resistor.

4. The invention of claim 3 further comprising means, operable in response to a firs input signal derived from a power source and a second input signal outputted from the transformer, for producing the reference voltage signal as an output, the current limiting means being connected to receive the reference voltage signal from the producing means and the latter being connected to receive the second input signal from the transformer.

5. The invention of claim 4 further comprising means, connected to receive the control signal from the producing means and responsive thereto, for varying current flow from the power source through the primary winding.

6. The invention of claim 5 wherein the producing means is operative in response to current flow through the diode to vary the control signal, and wherein the varying means is operative in response to the thus varied control signal to decrease current flow through the primary winding.

7. In a switching power supply, apparatus comprising in combination:
   a transformer having at least one primary winding and a plurality of secondary windings, the plurality comprising a first winding adapted to provide an output signal for external use and a second winding adapted to provide a feedback signal for internal current limiting;
   current limiting means, comprising a diode connected to the secondary side to receive the feedback signal and reverse-biased in reference to the feedback signal, for preventing current flow through the diode when the feedback signal exceeds a predetermined level during normal operation of the power supply, and for permitting current flow through the diode when the feedback signal is less than the predetermined level, the current limiting means being operative in response to the feedback signal and a reference voltage signal to prevent or permit current flow through the diode, the current limiting means comprising a parallel combination having at least two branches, one branch comprising a series combination of the diode and a resistor, and the other branch comprising a second resistor;
   the second winding being adapted to provide the feedback signal by being connected to a feedback circuit which in turn is connected to the current limiting means, the feedback circuit being operative in response to a voltage induced in the second winding to provide the feedback signal and to maintain the feedback signal in excess of the predetermined level under normal operating conditions of the power supply, the feedback circuit comprising:
   (a) a third resistor connected across the second winding;
   (b) a rectification diode connected to one end of the winding between the one end and the third resistor; and
   (c) a capacitor connected across the third resistor; and
   means, operable in response to a first input signal derived from a power source and a second input signal outputted from the transformer, for producing the reference voltage signal and a variable control signal as outputs, the current limiting means being connected to receive the reference voltage signal from the producing means and the latter being connected to receive the second input from the transformer.

8. The invention of claim 7 further comprising means, connected to receive the control signal from the producing means and responsive thereto, for varying current flow from the power source through the primary winding.

9. The invention of claim 8 wherein the current limiting means comprises a parallel combination having two branches, one branch comprising the series combination and the other branch comprising a fourth resistor.

10. In a switching power supply, apparatus comprising in combination:
    a transformer having a primary side comprising at least one primary winding and a secondary side comprising at least one secondary winding, the secondary side being adapted to provide an output signal for use by an external load and a feedback signal for use in internal current limiting;
    current limiting means, comprising a diode connected to the secondary side to receive the feedback signal and reverse-biased in reference to the feedback signal, for preventing current flow through the diode when the feedback signal is less than the predetermined level, the current limiting means being operative in response to the feedback signal and a reference voltage signal to prevent or permit current flow through the diode; and
    means, operable in response to a first input signal derived from a power source and a second input signal outputted from the secondary side, for producing the reference voltage signal as an output, the current limiting means being connected to receive the reference voltage signal from the producing means and the latter being connected to receive the second input signal from the secondary side.

11. The invention of claim 10 further comprising means, connected to receive a control signal from the producing means, for varying current flow from the power source through the primary winding in response to a change in the control signal.

12. The invention of claim 11 wherein the varying means comprises a field-effect transistor.

13. The invention of claim 11 wherein the current limiting means comprises a series combination of a resistor and the diode, the diode being interposed between the resistor and the secondary side.

14. The invention of claim 13 wherein the current limiting means comprises a series combination of the diode, a zener diode, and the resistor, the diodes being interposed between the resistor and the secondary side.

15. The invention of claim 13 wherein the current limiting means comprises a parallel combination having at least two branches, a first of the branches comprising the series combination and a second of the branches comprising a resistor.

16. The invention of claim 15 wherein the producing means comprises a pulse-width modulator circuit.

17. The invention of claim 16 wherein the producing means comprises an integrated pulse-width modulator circuit.

18. The invention of claim 16 wherein the varying means comprises a field-effect transistor.

19. The invention of claim 11 wherein the producing means comprises a pulse-width modulator circuit.

20. The invention of claim 19 wherein the producing means comprises an integrated pulse-width modulator circuit.

21. The invention of claim 10 wherein the current limiting means comprises a series combination of a resistor and the diode, the series combination being interposed between the secondary side and the producing means, and the diode being interposed between the resistor and the secondary side.

22. The invention of claim 21 wherein the current limiting means comprises a series combination of the diode, a zener diode, and the resistor, the diodes being interposed between the resistor and the secondary side.

23. The invention of claim 21 wherein the current limiting means comprises a parallel combination having at least two branches, a first of the branches comprising the series combination and a second of the branches comprising a resistor.

* * * * *